United States Patent
Patel et al.

(10) Patent No.: US 12,391,619 B2
(45) Date of Patent: Aug. 19, 2025

(54) INORGANIC-ORGANIC PHOSPHATE CERAMICS AND COATINGS

(71) Applicant: Latitude 18, Inc., Sims, NC (US)

(72) Inventors: Sameerkumar V. Patel, Sims, NC (US); Vadym Drozd, Sims, NC (US)

(73) Assignee: LATITUDE 18, INC., Sims, NC (US)

( * ) Notice: Subject to any disclaimer, the term of this patent is extended or adjusted under 35 U.S.C. 154(b) by 605 days.

(21) Appl. No.: 17/871,916

(22) Filed: Jul. 23, 2022

(65) Prior Publication Data

US 2022/0356117 A1  Nov. 10, 2022

Related U.S. Application Data

(60) Continuation of application No. 16/941,091, filed on Jul. 28, 2020, now Pat. No. 11,396,480, which is a division of application No. 15/319,584, filed as application No. PCT/US2015/036026 on Jun. 16, 2015, now Pat. No. 10,766,821.

(60) Provisional application No. 62/012,462, filed on Jun. 16, 2014.

(51) Int. Cl.
*C04B 35/447* (2006.01)
*C04B 41/61* (2006.01)
*C04B 41/62* (2006.01)
*C04B 41/67* (2006.01)
*C04B 41/82* (2006.01)
*C09D 5/08* (2006.01)
*C09D 7/63* (2018.01)
*C09D 175/04* (2006.01)
*C23C 22/22* (2006.01)
*C08K 3/32* (2006.01)

(52) U.S. Cl.
CPC ........... *C04B 35/447* (2013.01); *C04B 41/61* (2013.01); *C04B 41/62* (2013.01); *C04B 41/67* (2013.01); *C04B 41/82* (2013.01); *C09D 5/08* (2013.01); *C09D 5/084* (2013.01); *C09D 7/63* (2018.01); *C09D 175/04* (2013.01); *C23C 22/22* (2013.01); *C04B 2235/3206* (2013.01); *C04B 2235/3418* (2013.01); *C04B 2235/447* (2013.01); *C04B 2235/48* (2013.01); *C08K 2003/321* (2013.01)

(58) Field of Classification Search
CPC ....... C04B 35/447; C04B 41/61; C04B 41/62; C04B 41/67; C04B 41/82; C04B 2235/3418; C04B 2235/447; C04B 2235/48; C04B 2235/3206; C09D 7/63; C09D 5/08; C09D 5/084; C09D 175/04; C08K 2003/321; C23C 22/22
USPC ........................................................ 428/702
See application file for complete search history.

(56) References Cited

U.S. PATENT DOCUMENTS

| 5,773,090 | A | 6/1998 | Buttner et al. |
| 2002/0009622 | A1* | 1/2002 | Goodson ................. C04B 41/70 428/703 |

FOREIGN PATENT DOCUMENTS

| EP | 1571239 B1 | 10/2009 |
| JP | 2000129460 A | 5/2000 |
| JP | 2009107916 A | 5/2009 |

OTHER PUBLICATIONS

Latitude 18, INC.; International Patent Application No. PCT/US2015/036026, International Search Report and Written Opinion, dated Sep. 14, 2015, 14 pages.
WIPO; International Preliminary Report on Patentability for International Application No. PCT/US2015/036026 dated Dec. 20, 2016, 11 pages.
U.S. Appl. No. 16/941,091, filed Jul. 28, 2020, now, Pending.
U.S. Appl. No. 15/319,584, filed Dec. 16, 2016, now, U.S. Pat. No. 10,766,821, Sep. 8, 2020.

\* cited by examiner

*Primary Examiner* — Kelechi C Egwim
(74) *Attorney, Agent, or Firm* — Christopher J. Knors; Moore & Van Allen PLLC

(57) ABSTRACT

This disclosure relates to an inorganic-organic metal phosphate ceramic coating from the reaction of an inorganic phosphate of the formulas (i) $A_m(H_2PO_4)_m \cdot nH_2O$ or (ii) $AH_3(PO_4)_2 \cdot nH_2O$; where A is ammonium or an m-valent metal element; m=1, 2, or 3; and n is 0 to 25; and at least one metal oxide or hydroxide represented by the formula $B_{2m}O_m$ or $B(OH)_{2m}$, where B is a 2m-valent metal; and m=1 or 1.5; thereof; and at least one polymer capable of reacting with at least the one metal oxide or hydroxide; or a first organic precursor combined with the inorganic phosphate and a second organic precursor combined with the at least one metal oxide or hydroxide, the second organic precursor configured to chemically react with the one or more first organic precursor.

15 Claims, No Drawings

INORGANIC-ORGANIC PHOSPHATE CERAMICS AND COATINGS

CROSS-REFERENCE TO RELATED APPLICATIONS

This application is a continuation application of U.S. application Ser. No. 16/941,091, filed Jul. 28, 2020, which is a divisional application of U.S. application Ser. No. 15/319,584, filed Dec. 16, 2016, which is a 35 U.S.C. § 371 National Stage Application of International Application No. PCT/US2015/036026, filed Jun. 16, 2015, which claims the benefit of U.S. Provisional Application No. 62/012,462 filed on Jun. 16, 2014, the entirety of each of which is incorporated herein by reference.

TECHNICAL FIELD

This disclosure relates to metal phosphate hybrid ceramic comprising an organic phase. In one aspect, the inorganic phosphate ceramic composition is prepared from one or more acid-phosphates, one or more of alkaline metal oxide or metal hydroxide components, and an effective amount of one or more polymers or polymeric precursors.

BACKGROUND

Providing waterproofing to ceramic and or cementitious forms or coatings has proven elusive. Typically, water resisting materials are included in the pre-set formulation in the desire to have them bloom or migrate to the surface upon or after setting. Such techniques result in the dissipation of the water repellency properties over time. The basic nature of such materials has resisted most attempts at incorporating materials directly into the ceramic/cement structure without altering, in a negative way, the properties of the ceramic/cement.

SUMMARY

In a first embodiment, an article is provided. The article comprising an inorganic-organic phosphate composition in direct contact with the article, the inorganic-organic phosphate composition: at least one metal phosphate phase comprising one or more reaction products of (a) one or more acid-phosphates representative of one or more of formula (i) or (ii): (i), $A_m(H_2PO_4)_m \cdot nH_2O$; or (ii) $AH_3(PO_4)_2 \cdot nH_2O$; where A is ammonium or a m-valent metal element of m=1, 2, or 3; and n is 0 to 25; and (b) one or more metal oxide or hydroxide represented by either or both of the formulas $B_{2m}O_m$ or $B(OH)_{2m}$, where B is a 2m-valent metal where m=1 or 1.5; and at least one organic phase layer, wherein the at least one metal phosphate phase is substantially between the at least one organic phase layer and the article.

In one aspect, the m-valent metal element of the one or more acid-phosphates is sodium, potassium, magnesium, calcium, or aluminum. In another aspect, alone or in combination with any of the previous aspects, the m-valent metal element of the one or more metal oxide or hydroxide is magnesium, zinc, calcium, nickel, or copper.

In another aspect, alone or in combination with any of the previous aspects, the organic phase comprises the at least partial reaction product of acrylic acid, tartaric acid, citric acid, propionic acid, tannic acid, gallic acid, mellitic acid, pyruvic acid, eugenol, acrylic acid, maleic acid, itaconic acid, alkali earth stearate, or 2-ethoxybenzoic acid with the one or more metal oxides or hydroxides.

In another aspect, alone or in combination with any of the previous aspects, the organic phase comprises polyalkanoic acid, polyacrylic acid, polymethacrylic acid, polyhydroxymethylacrylate, polyvinyl chloride, polyvinyl acetate, polybutadiene-styrene, carboxylated polybutadiene-styrene, nitrile-butadiene, carboxylated nitrile butadiene, methyl methacrylate butyl acrylate copolymer, polyoxyalkylene alkyl ether, or propylene glycol.

In another aspect, alone or in combination with any of the previous aspects, the organic phase comprises the at least partial reaction product of a first organic precursor and a second organic precursor. In another aspect, alone or in combination with any of the previous aspects, the at least one first organic precursor is one or more aromatic diisocyanate, aliphatic diisocyanate, polyisocyanate, diepoxy, and polyepoxy. In another aspect, alone or in combination with any of the previous aspects, the at least one second organic precursor is one or more diamine, polyamine, and polyol.

In a second embodiment, a method of forming an inorganic-organic phosphate ceramic is provided. The method comprising combining: (i) at least one acid-phosphate; (ii) at least one metal oxides or hydroxide; (iii) an organic phase precursor at a loading sufficient to provide a top coat of substantially organic material; and (iii) combining (i) and (ii).

In a first aspect, the at least one acid-phosphate is one or more acid-phosphates representative of one or more of formula (i), $A_m(H_2PO_4)_m \cdot nH_2O$ or (ii) $AH_3(PO_4)_2 \cdot nH_2O$; where A is ammonium or a m-valent metal element; m=1, 2, or 3; and n is 0 to 25; and (b) at least one sparingly soluble metal oxide represented by the formula $B_{2m}O_m$ or $B(OH)_{2m}$, where B is a 2m-valent metal; and m=1 or 1.5.

In another aspect, alone or in combination with any of the previous aspects, the at least one acid-phosphate is at least one of alkali metal dihydrogen phosphate $MH_2PO_4$, alkali earth dihydrogen phosphate $M(H_2PO_4)_2$ or its hydrate, or mixtures thereof.

In another aspect, alone or in combination with any of the previous aspects, the at least one metal oxide or hydroxide is at least one of magnesium oxide, barium oxide, zinc oxide, calcium oxide, copper oxide, and hydroxides thereof, or, independently or in combination, magnesium brine containing an effective amount of magnesium hydroxide.

In another aspect, alone or in combination with any of the previous aspects, the at least one acid-phosphate is one or more of mono potassium phosphate, mono calcium phosphate, and their hydrates, and the at least one s metal oxide or hydroxide is one or more of magnesium oxide, magnesium hydroxide, calcium oxide, or calcium hydroxide.

In another aspect, alone or in combination with any of the previous aspects, the method further comprises combining one or more of an inorganic mineral silicate, wollastonite, talc, amorphous magnesium silicate, amorphous calcium silicate, diatomaceous earth, aluminosilicate, olivine, feldspar, calcined Kaolin, mullite, colloidal silica, silicon dioxide, alumina, or amorphous silicon dioxide.

In another aspect, alone or in combination with any of the previous aspects, the organic phase precursor comprises the at least partial reaction product of acrylic acid, tartaric acid, citric acid, propionic acid, tannic acid, gallic acid, mellitic acid, pyruvic acid, eugenol, acrylic acid, maleic acid, itaconic acid, alkali earth stearate, or 2-ethoxybenzoic acid with the one or more metal oxide or hydroxide.

In another aspect, alone or in combination with any of the previous aspects, the organic phase precursor comprises polyalkanoic acid, polyacrylic acid, polymethacrylic acid, polyhydroxymethylacrylate, polyvinyl chloride, polyvinyl acetate, polybutadiene-styrene, carboxylated polybutadiene-styrene, nitrile-butadiene, carboxylated nitrile butadiene, methyl methacrylate butyl acrylate copolymer, polyoxyalkylene alkyl ether, or propylene glycol.

In another aspect, alone or in combination with any of the previous aspects, the organic phase precursor comprises the at least partial reaction product of a first organic precursor and a second organic precursor. In another aspect, alone or in combination with any of the previous aspects, the at least one first organic precursor is one or more aromatic diisocyanate, aliphatic diisocyanate, polyisocyanate, diepoxy, or polyepoxy. In another aspect, alone or in combination with any of the previous aspects, the at least one second organic precursor is one or more diamine, polyamine, or polyol.

In another aspect, alone or in combination with any of the previous aspects, the combining is performed with high shear. In another aspect, alone or in combination with any of the previous aspects, the method further comprises sequentially or concurrently, at least one of painting, brushing, troweling, spraying, and vaporizing one or more of the at least one acid-phosphate and/or the at least one metal oxide or hydroxide.

In a third embodiment, an inorganic-organic metal phosphate ceramic formed from the presently disclosed method is provided.

In a fourth embodiment, a sprayable inorganic-organic phosphate ceramic precursor system is provided. The system comprising an aqueous-based slurry or a suspension, separately comprising components: (a) an aqueous-based slurry or a suspension at least one inorganic phosphate representative of one or more of formula (i), $A_m(H_2PO_4)_m \cdot nH_2O$ or (ii) $AH_3(PO_4)_2 \cdot nH_2O$; where A is ammonium or a m-valent metal element; m=1, 2, or 3; and n is 0 to 25; and (b) at least one metal oxide or hydroxide represented by the formula $B_{2m}O_m$ or $B(OH)_{2m}$, where B is a 2m-valent metal; and m=1 or 1.5; and (c) at least one organic phase precursor present at a weight percent of 2-50.

In one aspect, the at least one acid-phosphate is at least one of alkali metal dihydrogen phosphate $MH_2PO_4$, alkali earth dihydrogen phosphate $M(H_2PO_4)_2$ or its hydrate, and mixtures thereof.

In another aspect, alone or in combination with any of the previous aspects, the at least one metal oxide or hydroxide is at least one of magnesium oxide, barium oxide, zinc oxide, calcium oxide, copper oxide, nickel oxide, and hydroxides thereof, or, independently or in combination, magnesium brine containing an effective amount of magnesium hydroxide.

In another aspect, alone or in combination with any of the previous aspects, the at least one acid-phosphate is one or more of mono potassium phosphate, mono calcium phosphate, and their hydrates, and the at least one metal oxide or hydroxide is one or more of magnesium oxide, magnesium hydroxide, calcium oxide, or calcium hydroxide.

In another aspect, alone or in combination with any of the previous aspects, the system further comprises one or more of an inorganic mineral silicate, wollastonite, talc, amorphous magnesium silicate, amorphous calcium silicate, diatomaceous earth, aluminosilicate, olivine, feldspar, calcined Kaolin, mullite, colloidal silica, silicon dioxide, amorphous silicon dioxide, alumina, or pigment.

In another aspect, alone or in combination with any of the previous aspects, the organic phase precursor comprises the at least partial reaction product of a $C_2$-$C_{50}$ hydrocarboxylic acid, acrylic acid, tartaric acid, citric acid, propionic acid, tannic acid, gallic acid, mellitic acid, pyruvic acid, eugenol, acrylic acid, maleic acid, itaconic acid, alkali earth stearate, or 2-ethoxybenzoic acid with the at least one sparingly soluble metal oxide.

In another aspect, alone or in combination with any of the previous aspects, the organic phase precursor comprises polyalkanoic acid, polyacrylic acid, polymethacrylic acid, polyhydroxymethylacrylate, polyvinyl chloride, polyvinyl acetate, polybutadiene-styrene, carboxylated polybutadiene-styrene, nitrile-butadiene, carboxylated nitrile butadiene, methyl methacrylate butyl acrylate copolymer, polyoxyalkylene alkyl ether, or propylene glycol.

In another aspect, alone or in combination with any of the previous aspects, the organic phase precursor comprises the at least partial reaction product of a first organic precursor and a second organic precursor. In another aspect, alone or in combination with any of the previous aspects, the at least one first organic precursor is one or more aromatic diisocyanate, aliphatic diisocyanate, polyisocyanate, diepoxy, polyepoxy. In another aspect, alone or in combination with any of the previous aspects, the at least one second organic precursor is one or more diamine, polyamine, or polyol.

In another aspect, alone or in combination with any of the previous aspects, the slurry or the suspension, separately or combined, is configured for providing shear thinning during mixing of components (a) or (b) or both of components (a) and (b).

BRIEF DESCRIPTION OF THE DRAWINGS

NONE

DETAILED DESCRIPTION

The present disclosure provides, among other things, phosphate-based, organic-inorganic hybrid composite coatings having hydrophobic properties that minimize or reduce the penetration of water and/or corrosion of metals, for example steels and iron.

Generally, organic materials have and can be applied on top of ceramics or cementitious material to provide certain properties. Such properties are water resistance, stain resistance, crack resistance, and durability etc. These techniques result in the lack of benefit of hybrid properties at the matrix level, mainly, due to being applied on top of ceramics or cementitious materials and or coatings. Moreover, there is a clear distinction between organic and inorganic material as organic material being applied on top of inorganic material. Such system does not provide benefit of the presence of organic material within the inorganic matrix.

Hybrid systems can provide synergic properties to the ceramics and or cementitious forms or coatings in terms of physical, mechanical, and chemical properties.

As used herein, the phrases "acidic phosphate component" and "acid-phosphate" and "acid component" and "Part A" are used interchangeably unless otherwise indicated. As used herein, the phrase "sparingly soluble acidic phosphate component" refers to inorganic phosphates of chemical formula $A_m(H_2PO_4)_m \cdot nH_2O$, where A is metal cation, or mixtures thereof; where m=1-3, and n=0-6 having low solubility product constants in aqueous media, e.g., e.g., solubility constants (Ksp) of at least $10^{-4}$, $10^{-5}$, $10^{-6}$, $10^{-7}$, $10^{-8}$, $10^{-9}$ or smaller.

As used herein phrases "metal oxide and hydroxide" and "basic component" and "alkaline component" and "alkaline precursor" are used interchangeably unless otherwise indicated. The phrases "sparingly soluble metal oxide or hydroxide" and "sparingly soluble alkaline component" and "sparingly soluble alkaline precursor" are inclusive of metal oxide and hydroxide materials that are sparingly soluble, e.g., have low solubility product constants in aqueous media, e.g., e.g., solubility constants (Ksp) of at least $10^{-4}$, $10^{-5}$, $10^{-6}$, $10^{-7}$, $10^{-8}$, $10^{-9}$ or smaller. In one aspect, the solubility of the metal oxide or hydroxide is less than about 0.1 moles/liter water. In one aspect, the phrases sparingly soluble basic metal oxide and sparingly soluble basic metal hydroxide component" and "sparingly soluble metal oxide and hydroxide" and "sparingly soluble alkaline component" and "sparingly soluble alkaline precursor" are exclusive of materials that are readily soluble, e.g., have high solubility product constants in aqueous media.

As used herein, the product of the "acid-phosphate" and the "metal oxide and hydroxide" provides for a metal phosphate phase having, in one aspect, have low solubility product constants in aqueous media, e.g., e.g., solubility constants (Ksp) of $10^{-8}$, $10^{-9}$ or smaller.

As used herein the phrase "organic phase" is associated with one or both of the acid-phosphate or metal oxide or hydroxide, or, the reaction product of the acid-phosphate and the metal oxide or hydroxide (e.g. "the metal phosphate phase"). The term "associated" includes chemical bonding, ionic or hydrostatic interaction of the organic phase with the metal phosphate phase. While not held to any theory, it is believed the organic phase provides for an organic-inorganic phosphate coating where the organic phase is substantially located at the air-facing surface of the coating.

As used herein, the phrase "aqueous mixture" refers to a combination of at least a quantity of water and at least one of the acid phosphate or metal oxide or hydroxide. For example, the aqueous mixture can contain mostly water and suspended, dispersed, or slurried components, and may also contain non-aqueous components such as alcohols and other solvents. Preferably, water is the major liquid phase.

The amount of solids (e.g., the acid phosphate, metal oxide or hydroxide and/or other solids) present in the aqueous mixture can be between 1 weight percent to about 95 weight percent, preferably 35-90 weight percent, or 50-80 weight percent solids.

In addition to the management of the hydrophobicity, the present disclosure provides manufacturing methods that optimize the preparation of the acid-phosphates and the metal oxide or hydroxides prior to combination so as to manage the chemical reactions and/or pH of the chemical reactions of the metallic surface and the acid-phosphates and the metal oxide or hydroxides. Examples of the inorganic phosphate coatings provided herein include a magnesium potassium phosphate coating, and calcium potassium phosphate coating, either of which optionally contains the one or more polymers or at least partially reacted polymer precursors as discussed above. In one aspect, the coating comprises the one or more polymers or at least partially reacted polymer precursors chemically integrated therewith or the reaction product of one or more precursors of the polymer. These compositions are disclosed herein for providing two-part, sprayable metal phosphate ceramics, suitable for coating steels, aluminum, and other corrodible metals.

It has now been observed that polymers or polymeric precursors, when added to one or both of an acid-phosphate/ metal oxide or hydroxide phosphate ceramic precursor formulation, are combined or otherwise formed "in-situ" with an formulation greatly enhance the water resistance, water proofing, electric isolation, and/or corrosion resistance of the coating.

The above organic-inorganic-phosphate ceramic can be used as monolithic forms, or as coatings that serve as a surface preparation for further coating and/or painting, a function it performs effectively with excellent adhesion. In contrast to the conventional methods of passivating/corrosion protecting metal surfaces, the present disclosure provides improving the metal-phosphate ceramic, reducing its porosity and/or reducing its crystallinity such that the hydrophobicity is controlled and/or corrosion preventive aspects, and others, are chemically associated with the metal-phosphate ceramic.

In one aspect, the aqueous mixture of acid-phosphate comprises one or more acid phosphate salts, optionally comprising one or more hydrophobic agents or hydrophobic precursor components, with or without phosphoric acid, calcined kaolin, and/or colloidal silica, the mixture having a pH between about 1 and about 6 (preferably being between about 1.5 to about 5, more preferably between about 2 to about 4).

In one aspect, the aqueous mixture of metal oxide or hydroxide comprises one or more polymers or polymeric precursors. The aqueous mixture of metal oxide or hydroxide typically has a pH between about 8 to about 12, preferably about 9 to about 14, more preferably a pH between about 11 to about 13. The polymers or polymeric precursors can be added alone or in combination with wollastonite, amorphous magnesium silicate, silica, amorphous silicon dioxide, diatomaceous earth, olivine, feldspar and the like to either or both of the acidic phosphate and the basic metal oxide/hydroxide.

To be clear, such polymers or polymeric precursors are not simply "additives" as they are added at amounts greater than an additive and function differently from that of a additive. The polymers or polymeric precursors are added and are intended to chemically combine with each other to form an oligomeric or a polymeric organic phase. The polymers or polymeric precursors may also combine, to a minor extent, with one or more of the acid-phosphates, the metal oxide or hydroxide, and/or a metallic surface, and/or the metallic phosphate moieties present and/or created.

During the process where the acid-phosphate and the metal oxide or hydroxide form the ceramic, the hydrophobic agents, and in particular, their respective precursor components react or combine to form the oligomeric or polymeric hydrophobic agents. During setting of the phosphate ceramic or a period of time thereafter, the oligomeric or polymeric hydrophobic agent presents to the outer surface (air-facing surface) of the object coated so as to provide, among other things, a protective, mostly organic phase together with a phosphate ceramic phase.

In one aspect, the instant method provides for a treated iron or steel surface, at least one iron-magnesium-phosphate moiety is believed formed, e.g., a hydrophobic, hydrated magnesium hydrogen iron phosphate, that is chemically distinct from $FePO_4(2H_2O)Fe_3(PO_4)_2(8H_2O)$, and/or $Fe_5H_2(PO_4)_2(4H_2O)$ provided by conventional iron phosphating processes, the latter being generally crystalline and porous. Additional compositions, including, polyphosphates, and/or amorphous organic polymeric moieties, as discussed above, as well as inorganic metal-silicates, can be present and provide additional and/or synergistic water penetration and/ or corrosion protection.

The final pH of the metal phosphate ceramic or a coating prepared from same can be provided in the passivation range of steel, e.g., between about pH 9 and about pH 12, between about pH 9.5 and about pH 11.5, between about pH 10.0 and about pH 11.0, between about pH 9.0 and about pH 10.5, between about pH 9.5 and about pH 10.0, between about pH 10.0 and about pH 10.5. In one aspect, the surface of a coated article can be provided with a basic nature, for example between about pH 9 and about pH 12, between about pH 9.5 and about pH 11.5, between about pH 10.0 and about pH 11.0, between about pH 9.0 and about pH 10.5, between about pH 9.5 and about pH 10.0, between about pH 10.0 and about pH 10.5 to prevent or inhibit bacterial and/or microorganism growth or colonization on the surface of the coated article. The coated article can be, for example, a medical article, a ship hull, a vertical or horizontal surface, or water treatment facility component.

In certain aspects of the present disclosure, the metallic surface is that of a transition metal or its alloy, for example, iron, chromium, aluminum, copper, etc. Processes and articles prepared therefrom disclosed and described herein overcome many if not all of the problems related to conventional passivation processes of iron, steels, aluminum, and other corrodible metals. The instant processes also provide a more economical, environmentally-friendly method of coating steel and other metal surfaces with acid-base inorganic phosphate based coatings that not only passivate the layer but also provide abrasion resistance along with good aesthetics in one step.

The metal phosphate ceramics, when used as a coating as disclosed herein can comprise, in part, the formation of poly phosphates, and in particular, poly phosphates formed by phosphites at the interfacial regions of the substrate surface in the instant passivation layer. Polyphosphate alone or in combination with the polymer or reaction product of the polymeric precursors can provide impermeablity to water and humidity, and, independently, can improve corrosion resistance to the metallic surface. In one aspect, polyphosphates in combination with the metallic surface and/or interfacial regions of the metal substrate comprise the passivation layer and/or provide water resistance or water proofing of the ceramic.

Acid-phosphate—The acid-phosphate consists of an acid-phosphate representative of the formula, $A_m(H_2PO_4)_m \cdot nH_2O$, where A is an m-valent element such as sodium (Na, m=1), potassium (K, m=1), magnesium (Mg, m=2), calcium (Ca, m=2), aluminum (Al, m=3) etc. A may also be a reduced oxide phase when higher-valent oxides are used. For example, for iron, which exists in valence state of +2 and +3 ($FeO$ and $Fe_2O_3$ as oxides), A can be the metal of lower oxidation state. It can also be a cation of oxides of four-valent metal oxide such as $ZrO^{2+}$, in which case m=2. $nH_2O$ in the formula above is the bound water, where n can be 0 or any number, normally ranging from 0 to 25.

It is possible to use hydro phosphates of trivalent metals such as aluminum, iron and manganese represented by the formula $AH_3(PO_4)_2 \cdot nH_2O$, where A is a transition metal that includes aluminum, iron, manganese, yttrium, scandium, and all lanthanides such as lanthanum, cerium, etc.

Metal oxide or hydroxide—The metal oxide or hydroxide can include for example, basic oxides, hydroxides and basic minerals. In one aspect, the metal oxide or hydroxide is "sparingly soluble" e.g., an oxide and hydroxide with a solubility product constant less than the acid phosphate precursor. The oxide or hydroxide may be represented by the formula $B_{2m}O_m$ or $B(OH)_{2m}$, where B is a 2m-valent metal. All divalent metal oxides (m=1), and some trivalent metal oxides (m=1.5) in reduced state fall into this category of small solubility product constant oxides. Examples of divalent oxides are, but not limited to, magnesium oxide, barium oxide, zinc oxide, calcium oxide and copper oxide. Examples of trivalent oxides in reduced state are iron oxide (FeO), and manganese oxide (MnO). In preferred aspects of the instant disclosure, 0 to about 10 molar excess of metal oxide or hydroxide relative to acidic component is used. For example, about 0.1-10 molar excess of $Mg(OH)_2$ based on MKP acid phosphate can be used. In one aspect, the molar ratio of acid:base components can be between about 0.9:1.0 to about 1.0:3.0; preferably about 1.0:2.0; and most preferably, about 1.0:1.8. For example, the composition comprising $Mg(OH)_2$:$KH_2PO_4$=1.8:1.0 provides equal volumes of Parts A and B during spraying. In other aspects, spray coatings of the instant compositions having a molar ratio of about 1:2 or about 1:1.5 (acid:base components) with mixing, sprayed well and corrosion-protected and/or water proofed effectively.

In case the pH of the acidic precursor is higher than needed for instant reaction, phosphoric acid may be added and the pH may be adjusted to bring down the pH. A preferred pH selected is between 3 and 4, and the most preferred pH is between 3 and 3.5. either elevating the pH of phosphoric acid or that of an acid-phosphate such as magnesium dihydrogen phosphate ($Mg(H_2PO_4)_2$) or aluminum trihydrogen phosphate ($AlH_3(PO_4)_2$) by neutralizing partially using an alkaline oxide, hydroxide, or a mineral, or by acidifying a dihydrogen phosphate such as mono potassium phosphate ($KH_2PO_4$) that has a pH>3.5 by adding a small but appropriate amount of phosphoric acid or a low pH acid phosphate such as $Mg(H_2PO_4)_2$ or aluminum trihydrogen phosphate $AlH_3(PO_4)_2$.

One or more of the components (acid-phosphate or metal oxide or hydroxide) of the instant composition can be wet milled to an average particle size of about 1 to about 150 micron, or to about 1 to about 100 micron, or to about 5 to about 50 micron or about to −25 micron. In one aspect, the acidic phosphate or basic precursor is wet-milled so that the average particle size passes through 230 mesh sieve (less than 70 micron). To improve atomization and/or cure/set and/or appearance qualities of the coating and to reduce or eliminate pit-defects in the coating, a small average particle size for the metal oxide or hydroxide is used, for example, 1 micron to less than 50 micron, or 1 micron to less than 25 micron.

In one aspect, to achieve a desired setting rate and prevent sagging of a coating prepared from the hydrophobic phosphate ceramic disclosed herein, about 30-50 weight percent basic metal oxide/hydroxide and about 55-75 weight percent acid-phosphate can be used. In one preferred aspect, about 40 weight percent magnesium hydroxide and about 62 weight percent mono potassium phosphate can be used. Other loadings may be used for coating horizontal surfaces.

For reasons not entirely understood, when the acidic component is phosphoric acid and the metal oxide or hydroxide is sparingly soluble and used in a stoichiometric amount greater than 10% of the acid-phosphate, corrosion resistance is less than that when using the acidic phosphate/metal oxide or hydroxides herein disclosed, in particular, sparingly soluble acid/base components. Thus, in one aspect, improvement in corrosion protection is achieved when both phosphoric acid as the inorganic acidic phosphate and iron oxide as the metal oxide precursor are excluded.

In another aspect, the instant compositions, either as bulk forms or as coatings can be formulated to provide aesthetic properties, such as color, proper shine, and texture. This effect may be achieved, for example, by adding pigments, color aggregate, crushed glass, sand, etc, to the instant acidic phosphate/alkaline metal oxide/hydroxide formulations. For example, the resulting coating comprising crushed glass prepared by the processes disclosed herein provides a very dense, glassy surface. Additional suitable ceramic pigments may be further added to produce colored paints. Soluble glass in combination with the instant compositions above can also be used in formulations for coating of solid objects, to provide very dense, glassy solid coatings having corrosion resistance.

In one aspect, the instant compositions can be configured as separate, atomizible, sprayable inorganic phosphate precursors that can be sprayed at a relatively thin thickness. The compositions can hold high solids contents and yet still hold the solids until setting and thus avoiding the solids migrating or dislodging from the point of application, e.g., down a wall, beam, curved surface, or from a ceiling surface. Such spray coated phosphate ceramic compositions produce high-strength, rapid-setting phosphate ceramic coatings that provide corrosion protection and/or be used as an undercoating in combination with a polymeric coating or paint, such as an acrylic- or urethane-based coating or paint. In one aspect, said phosphate spray coating compositions are suitable for spray coating on metal surfaces, for example, structural elements and chassis of transportation vehicles such as automobiles, trains, cycles, aerospace vehicles, trucks, and buses. Methods of providing Part A and Part B compositions and equipment suitable for high-shear mixing and spraying of the phosphate ceramic materials disclosed herein is disclosed in co-assigned U.S. Patent Application Publication No. 2011/0143910, which is incorporated by reference in its entirety.

In one aspect, the atomizable phosphate ceramic composition can comprise an acid-phosphate comprising an aqueous solution, suspension, or slurry of an acid-phosphate, for example, of chemical formula $A_m(H_2PO_4)_m \cdot nH_2O$, where A is hydrogen ion, ammonium cation, metal cation, or mixtures thereof; where m=1-3, and n=0-6; the first component solution adjusted to a pH of about 2 to about 5; a metal oxide or hydroxide, comprising, for example, an aqueous solution, suspension, or slurry of an alkaline oxide or alkaline hydroxide represented by $B_{2m}O_m$, $B(OH)_{2m}$, or mixtures thereof, where B is an element of valency 2m (m=1, 1.5, or 2) the second component solution adjusted to a pH of between 9-14.

Optionally, a rheology modifier/suspending agent in an amount capable of providing shear thinning of either the first component or the second component and further capable of suspending a high solids content of either the first component or the second component for atomization can be added. In one aspect, the rheology modifier is added in an amount of 0.01 to about 10 weight percent of the composition. The rheology modifier/suspending agent can be at least one of guar gum, diutan gum, welan gum, and xanthan gum. By using a rheology modifier/suspending agent in an amount capable of providing shear thinning of either the acidic component or the metal oxide or hydroxide and further capable of suspending a high solids content of either the acidic component or the metal oxide or hydroxide for atomization, excellent paint-like coatings for imparting corrosion resistance to metallic surfaces are obtained.

Optionally, pigments and/or aggregate material can be present in an amount in at least one of the acidic phosphate and the metal oxide or hydroxide capable of imparting an observable color and/or texture. The above atomizible spray coating can provide a thin, paint-like coating for imparting hydrophobicity and/or corrosion resistance to metallic surfaces.

Water may be added to the precursor component to reduce the viscosity thereof, or other types of viscosity reducing agents and/or rheology modifiers may be used. Commercial additives that prevent algae growth may also added to this precursor so that no algae growth occurs during storage of this precursor.

EXPERIMENTAL SECTION

The following examples are illustrative of the embodiments presently disclosed, and are not to be interpreted as limiting or restrictive. All numbers expressing quantities of ingredients, reaction conditions, and so forth used herein may be understood as being modified in all instances by the term "about." Accordingly, unless indicated to the contrary, the numerical parameters set forth herein may be approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches. Several experimental examples, listed below, were conducted in order to formulate, coat, and demonstrate the attributes of the instant compositions disclosed herein. pH values are provided using pH meters having +/−0.5 accuracy.

Examples of aromatic diisocyanates for mixing with Part A include 1,3-phenylene diisocyanate; 1,4-phenylene diisocyanate; 2,6-toluene diisocyanate; 2,4-toluene diisocyanate; 80% 2,4-TDI; 20% 2,6-TDI, blend of isomers; naphthalene, 1,5-diisocyanato; diphenyl oxide 4,4'-diisocyanate; 4,4'-methylenediphenyl diisocyanate; 2,4'-methylenediphenyl diisocyanate; 2,2'-diisocyanatodiphenylmethane; diphenyl-methanediisocyanate; 3,3'-dimethyl-4,4'-biphenylene isocyanate; 3,3'-dimethoxy-4,4'-biphenylene diisocyanate; benzene,1-[(2,4-diisocyanatophenyl)methyl]-3-isocyanato-2-methyl; and 2,4,6-triisopropyl-m-phenylene diisocyanate.

Examples of aromatic multi-isocyanates for mixing with Part A include 2,4-toluenediisocyanate dimer; tris(4-isocyanatophenyl) thiophosphate; 4,4',4''-triisocyanatotriphenylmethane; 2,4-toluene diisocyanate trimer; 1,3-diazetidine-2,4-dione, 1,3-bis[4-[(2-isocyanatophenyl)methyl]phenyl]; 1,3-diazetidine-2,4-dione, 1,3-bis[4-[(4-isocyanatophenyl)methyl]phenyl]; 4,4-MDI uretidinone; and polymethylene-polyphenyl polyisocyanate.

Examples of aliphatic-aromatic isocyanates for mixing with Part A include 1,4-xylylene diisocyanate; 1,3-xylylene diisocyanate; 1,3-bis(1-isocyanato-1-methylethyl)benzene; and 1,4-bis(1-isocyanato-1-methylethyl)benzene.

Examples of aliphatic diisocyanates for mixing with Part A include 1,6-hexamethylene diisocyanate; 1,5-diisocyanato-2-methylpentane; methyl 2,6-diisocyanatohexanoate; bis(isocyanatomethyl)cyclohexane; 1,3-bis(isocyanatomethyl)cyclohexane; 2,2,4-trimethylhexane 1,6-diisocyanate; 2,4,4-trimethylhexane 1,6-diisocyanate; 2,5(6)-bis(isocyanatomethyl)bicyclo[2.2.1]heptane; 1,3,3-trimethyl-1-(isocyanatomethyl)-5-isocyanatocyclohexane; 1,8-diisocyanato-2,4-dimethyloctane; octahydro-4,7-methano-1h-indenedimethyl diisocyanate; 1,1'-methylenebis(4-isocyanatocyclohexane) and hexanoic acid, [[2-ethyl-2-[[[[[5-isocyanato-1(or 5)-(methoxycarbonyl)pentyl]amino]carbonyl]oxy]methyl]-1,3-propanediyl] bis (oxycarbonylimino)] bis[isocyanato-, dimethyl ester.

Examples of aliphatic multi-isocyanates for mixing with Part A include, hexamethylene diisocyanate dimer; hexamethylene diisocyanate biuret; hexamethylene diisocyanate isocyanurate; 1,3,5-triazine-2,4,6 (1H,3H,5H)-trione, 1,3,5-tris[(5-isocyanato-1,3,3-trimethylcyclohexyl)methyl]; and 1,3-propanediol, 2-ethyl-2-(hydroxymethyl)-5-isocyanato-1-(isocyanatomethyl)-1,3,3-trimethylcyclohexane.

Examples of precursors for mixing with Part B include diols, triols, tetraols, polyols, phenols, polymer polyols, diamines, triamines and polyamines. Epichlorohydrine and epoxides from ethylene oxide, alkyloxides, or polymer polyols.

Examples of amines and polyamines include ethanolamine; diethanolamine; propanolamine; triethanolamine; ethylene diamine; diethylenetriamine; triethylenetetramine; 2-methylimidazole, imidazole; aniline-formaldehyde methylenedianiline; toluenediamine; n-(2-aminoethyl)piperazine; and 4,4'-diaminodiphenylmethane.

Examples of diol, triols, polyols, polymer polyols and other compounds include ethyleneglycol; 1,4-butanediol/THF; 1,4-butanediol/THF; neopentyl glycol; butylene oxide; glycerol; trimethylolpropane; trimethylolpropane, propylene glycol; pentaerythritol; sorbitol, mannitol; sorbitol, mannitol; sorbitol, mannitol; sucrose; phenol; bisphenol A; tetrabromo bisphenol A; nonylphenol, formaldehyde; p-t-butyl phenol, formaldehyde; phenol formaldehyde; bis [4-(2-hydroxypropoxy)phenyl] sulfone; phenol, formaldehyde, 1,2-propylene glycol; toluenediamine; toluenediamine, propylene glycol; glycerol, allyl glycidyl ether, trimethylolpropane polymer; epichlorohydrine; epichlorohydrine; epichlorohydrine; and castor oil, hydrogenated.

The polymer and polymeric precursors can be used amounts of about 2 weight percent to about 50 weight percent, or about 5 weight percent to about 40 weight percent, or about 7 weight percent to about 35 weight percent. Addition of other hydrophobic agents than those described above, in the acidic phosphate and/or metal oxide or hydroxide composition, can be employed, such as polysilicones, polysiloxanes, etc., in small amounts, e.g., less than 2 weight percent.

Organic-Inorganic Phosphate Coating Compositions

A range of phosphate compositions may be used as t coatings commensurate with the spirit and scope of that disclosed and described herein.

TABLE 1

Exemplary Phosphate Ceramic Composition

| Sample | Part A<br>Weight percent (%) of Part A | Part B<br>Weight percent (%) of Part B |
| --- | --- | --- |
| A | mono potassium phosphate (MKP) (40-65%) phosphoric acid (1-8%) colloidal silica (1-10%) diisocyanate monomer (5-30%) remainder water | magnesium hydroxide (25-50%) wollastonite (10-25%) xanthan gum (0.07%) Polyol monomer (5-30%) remainder water |
| B | mono potassium phosphate (MKP) (~63-64%) phosphoric acid (~8%) xanthan gum (0.15%) diisocyanate monomer (6-25%) remainder water | magnesium hydroxide (~38-39%) wollastonite (~20-21%) xanthan gum (0.07%) Polyamine monomer (~5-25%) Filler (~40-60%) remainder water |

In one exemplary sprayable composition commensurate with that summarized in Table 1, 9 w % diisocyanate was added to Part A (MKP) and 10 w % polyol was added to Part B (MgOH at 38-40 weight percent) prior to mixing and spraying. This loading of first and second organic precursors, when separately mixed and sheared with its corresponding Part A or Part B was spray coated on a corrodible surface, and provided a top layer comprising substantially polymeric isocyanate.

In another exemplary sprayable composition commensurate with that summarized in Table 1, 20 w % diisocyanate was added to Part A (MKP) and 25 w % polyamine was added to Part B (MgOH at 38-40 weight percent) prior to mixing and spraying. This loading of first and second organic precursors, when separately mixed and sheared with its corresponding Part A or Part B was spray coated on a corrodible surface, and provided a top layer comprising substantially polymeric urea. The nature of the diisocyanate and the polyol and/or polyamine can be adjusted (e.g., hydrocarbon content, functionality, aromaticity/aliphalicity etc.) to manipulate the properties of the compatibility and/or stability of the polymer precursors in the respective Part A/Part B, or to manipulate the properties of the organic phase and the topcoat properties of the organic-inorganic phosphate coating.

The cross-sectional compositional make-up of such a coating comprises, starting from the corrodible surface, is a passivation layer, a predominately inorganic phase layer of phosphate ceramic, and a top layer of substantially organic composition. In practice, the loading of first and second organic precursors will depend on the polymer system desired, the relative thickness of topcoat desired, the pigment loading needed, and the molecular weight of the precursors.

It was also observed that the of first and second organic precursors provided improved loading of pigment, more than can be loaded as compared to a conventional polymer based paint or coating, for example. Generally speaking, conventional, non-ceramic based paint and coating systems are characterized based on PVC (Pigment Volume Concentration) and CPVC (Critical Pigment Volume Concentration). PVC is understood to mean Pigment Volume of Pigment+Filler/Total Volume of Dry Coating. CPVC is a value, expressed as a ratio, of where there is just sufficient binder to coat the pigment surfaces and fill voids between pigment particles. In the present disclosure, the inorganic-organic phosphate ceramic is capable of higher loadings (e.g., 10%, 20%, 30%, or more than 40% higher wt. %) of pigment and/or filler than conventional non-ceramic based paint. While not to be held to any theory, it is believed that the organic component or phase of the inorganic-organic phosphate ceramic, which may chemically or otherwise associate with the phosphate ceramic constituents, provides more binder volume to the total volume of the dry coating and hence, provides more volume for the filler/pigment. Polymer-based paint and coatings systems typically cannot have filler more than a certain weight percentage (based on PVC and CPVC) because fillers/pigments do not participate in the film formation of such conventional coatings. On the other hand, the present compositions, comprising inorganic-organic hybrid systems comprise at least two-phases, at least one of which can be a binding phase for the filler/pigment while also binding to the filler/pigment. There may be some organic-inorganic binding phases as well in the presently disclosed compositions to accommodate higher loading of pigment/filler. Thus, the present compositions allows wide ranges of compositional loadings of fillers, pigments, etc., as the PVC and CPVC conventions as for conventional paints/coatings may not apply, for example, such that the Pigment Volume Concentration (PVC) that is greater than 0.5 to about 0.7 and the Critical Pigment Volume Concentration that is greater than 0.6 to less than 1.0.

We claim:

1. An inorganic-organic phosphate ceramic precursor system comprising:
   a first part comprising:
   (a) at least one inorganic phosphate salt representative of one or more of formula (i), $A_m(H_2PO_4)_m \cdot nH_2O$ or (ii) $AH_3(PO_4)_2 \cdot nH_2O$; where A is an m-valent metal element; m=1, 2, or 3; and n is 0 to 25 or phosphoric acid; and water;
   and a second part combinable with the first part, the second part comprising:
   (b) at least one basic oxide or hydroxide represented by the formula $B_{2m}O_m$ or $B(OH)_{2m}$, where B is a 2m-valent metal; and m=1 or 1.5; and water;
   wherein at least one of part (a) and part (b) comprise a polymer.

2. The system of claim 1, wherein the polymer is at least one of polyalkanoic acid, polyacrylic acid, polymethacrylic acid, polyhydroxymethylacrylate, polyvinyl chloride, polyvinyl acetate, polybutadiene-styrene, carboxylated polybutadiene-styrene, nitrile-butadiene, carboxylated nitrile butadiene, methyl methacrylate butyl acrylate copolymer, polyoxyalkylene alkyl ether, or propylene glycol.

3. The system of claim 1, wherein the at least one acid-phosphate is at least one of phosphoric acid, alkali metal dihydrogen phosphate $MH_2PO_4$, alkali earth dihydrogen phosphate $M(H_2PO_4)_2$ or its hydrate, and mixtures thereof.

4. The system of claim 1, wherein the at least one basic oxide or hydroxide is magnesium oxide, barium oxide, zinc oxide, calcium oxide, copper oxide, and hydroxides thereof, or, independently or in combination, magnesium brine containing an effective amount of magnesium hydroxide.

5. The system of claim 1, wherein the at least one acid-phosphate is one or more of mono potassium phosphate, mono calcium phosphate, and their hydrates, and the at least one basic oxide or hydroxide is magnesium oxide, magnesium hydroxide, calcium oxide, or calcium hydroxide.

6. The system of claim 1, further comprising one or more of an inorganic mineral silicate, wollastonite, talc, amorphous magnesium silicate, amorphous calcium silicate, diatomaceous earth, aluminosilicate, olivine, feldspar, calcined Kaolin, mullite, colloidal silica, silicon dioxide, amorphous silicon dioxide, or pigment.

7. The system of claim 1, wherein the pH of the first part is between 1 and 6.

8. The system of claim 1, wherein the pH of the second part is between 9 and 14.

9. The system of claim 1, wherein the at least one inorganic phosphate salt is present in the first part at 35 weight percent to 90 weight percent and the phosphoric acid is present in the first part at 1 weight percent to 8 weight percent.

10. The system of claim 1, wherein the at least one basic oxide or hydroxide present in the second part at between 35 weight percent to 90 weight percent.

11. The system of claim 1, wherein both part (a) and part (b) comprise the polymer.

12. The system of claim 1, wherein only part (a) comprise the polymer.

13. The system of claim 1, wherein only part (b) comprise the polymer.

14. The system of claim 1, wherein the polymer is present at 2 to 50 weight percent.

15. The system of claim 1, wherein the part (a) and the part (b) are sprayable or atomizible.

* * * * *